(12) United States Patent
Tang (10) Patent No.: US 11,265,922 B2
(45) Date of Patent: Mar. 1, 2022

(54) METHOD FOR ACCESSING WIRELESS LOCAL AREA NETWORK, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/763,876

(22) PCT Filed: Nov. 24, 2017

(86) PCT No.: PCT/CN2017/112944
§ 371 (c)(1),
(2) Date: May 13, 2020

(87) PCT Pub. No.: WO2019/100343
PCT Pub. Date: May 31, 2019

(65) Prior Publication Data
US 2021/0176790 A1     Jun. 10, 2021

(51) Int. Cl.
*H04W 74/02*     (2009.01)
*H04W 74/08*     (2009.01)
(Continued)

(52) U.S. Cl.
CPC ...... *H04W 74/0833* (2013.01); *H04B 17/318* (2015.01); *H04W 74/008* (2013.01);
(Continued)

(58) Field of Classification Search
CPC . H04W 74/0833; H04W 76/11; H04W 76/27; H04W 74/008; H04W 92/10;
(Continued)

(56) References Cited

U.S. PATENT DOCUMENTS

2005/0232209 A1* 10/2005 Buckley .............. H04W 72/005
370/338
2014/0079022 A1* 3/2014 Wang .................... H04W 36/22
370/331
(Continued)

FOREIGN PATENT DOCUMENTS

CN     105430687     3/2016

OTHER PUBLICATIONS

OPPO, "Discussion on Remaining Issues of On-Demand SI," 3GPP TSG-RAN2#99, R2-1707765, Aug. 2017, 3 pages.
(Continued)

*Primary Examiner* — Un C Cho
*Assistant Examiner* — Lalita W Pace
(74) *Attorney, Agent, or Firm* — Hodgson Russ LLP (57) ABSTRACT

Provided are a method for accessing a wireless local area network, a terminal device, and a network device. The method comprises: a terminal device sends a system message request to a network device, the system message request being used for requesting the network device to send a system message to the terminal device, and the system message being information for accessing a wireless local area network by the terminal device; and the terminal device receives the system message sent by the network device. In the method for accessing a wireless local area network in an embodiment of the present invention, for a 5G communication system, part or all of traffic can be transferred to the WLAN or an unlicensed frequency band by adding system information, thereby saving licensed frequency band resources.

6 Claims, 2 Drawing Sheets

(51) Int. Cl.
  *H04B 17/318* (2015.01)
  *H04W 76/11* (2018.01)
  *H04W 76/27* (2018.01)
  *H04W 74/00* (2009.01)
  *H04W 92/10* (2009.01)

(52) U.S. Cl.
  CPC ............ *H04W 76/11* (2018.02); *H04W 76/27* (2018.02); *H04W 92/10* (2013.01)

(58) Field of Classification Search
  CPC ..... H04W 84/12; H04W 88/06; H04W 36/22; H04W 36/14; H04W 48/14; H04W 48/18; H04B 17/318
  See application file for complete search history.

(56) References Cited

U.S. PATENT DOCUMENTS

| | | | | |
|---|---|---|---|---|
| 2014/0086211 | A1* | 3/2014 | Liu ........................ | H04L 45/38 370/331 |
| 2015/0350988 | A1 | 12/2015 | Himayat et al. | |
| 2016/0183313 | A1* | 6/2016 | Vallabhu ............... | H04W 76/12 370/329 |
| 2016/0192283 | A1* | 6/2016 | Kwak ................... | H04W 48/16 455/434 |
| 2016/0219475 | A1* | 7/2016 | Kim ...................... | H04W 28/08 |
| 2016/0309385 | A1* | 10/2016 | Zhang .................. | H04W 28/10 |
| 2017/0127325 | A1 | 5/2017 | Vikberg et al. | |
| 2017/0164230 | A1 | 6/2017 | You et al. | |
| 2017/0339614 | A1* | 11/2017 | Kim ........................ | H04L 12/66 |
| 2018/0213546 | A1* | 7/2018 | Zhao .................... | H04W 88/06 |
| 2019/0059048 | A1* | 2/2019 | Yeoh .................... | H04W 76/10 |
| 2019/0268830 | A1* | 8/2019 | Kim ................. | H04W 36/0072 |
| 2020/0084782 | A1* | 3/2020 | Rune .................... | H04W 48/14 |
| 2020/0280991 | A1* | 9/2020 | Kim ..................... | H04W 48/12 |
| 2021/0136661 | A1* | 5/2021 | Frenger ................ | H04W 48/12 |

OTHER PUBLICATIONS

WIPO, ISR for PCT/CN2017/112944, dated Aug. 14, 2018.
LG Electronics Inc., "Provision of WLAN identifiers," 3GPP TSG-RAN2 Meeting #88, R2-145198, Nov. 2014, 2 pages.
LG Electronics Inc., "Efficient SI request for other SI," 3GPP TSG-RAN WG2 Meeting #96, R2-168738, Nov. 2016, 2 pages.
Vivo, "Discussion on other SI request," 3GPP TSG-RAN WG2 Meeting #99bis, R2-1710943 (resubmission of R2-1708428), Oct. 2017, 5 pages.
EPO, Extended European Search Report for EP Application No. 17932762.2, dated Jul. 27, 2020.
KIPO, Office Action for KR Application No. 10-2020-7016843, dated Aug. 30, 2021.

* cited by examiner

METHOD FOR ACCESSING WIRELESS LOCAL AREA NETWORK, TERMINAL DEVICE, AND NETWORK DEVICE

CROSS-REFERENCE TO RELATED APPLICATION

This application is a U.S. national phase application of International Application No. PCT/CN2017/112944, filed Nov. 24, 2017, the entire disclosure of which is incorporated herein by reference.

TECHNICAL FIELD

The embodiments of the present disclosure relate to the field of communications, and more specifically, to a method for accessing a wireless local area network, a terminal device, and a network device.

BACKGROUND

The 3rd Generation Partnership Project (3GPP) has introduced loose-coupling interworking and tight-coupling schemes with Wireless LAN (WLAN) and unauthorized access technology from Long Term Evolution (LTE). The fifth-generation mobile communication technology (5-Generation, 5G) New Radio (NR) also needs to support accessing including unauthorized access technology of WLAN, so that part or all of the traffic can be transferred to the WLAN or unlicensed frequency band in case of considering the requirement of Quality of service (QoS), thereby realizing the saving of the resources of the authorized frequency band of the cellular network.

However, because LTE and 5G NR are not compatible, it is not easy to apply the loose-coupling interworking and tight-coupling schemes and the unauthorized access technology in the LTE system into 5G NR.

At present, there are no specific solutions for 5G NR for unauthorized access and WLAN access on the RAN side.

SUMMARY

There is provided a method for accessing a wireless local area network, a terminal device, and a network device, which can configure the WLAN of the terminal device by enhancing system information of the 5G NR, so that the terminal device can find a target Access Point (AP) and access the WLAN through the target AP.

In a first aspect, there is provided a method for accessing a wireless local area network, including:

sending, by a terminal device, a system message request to a network device, wherein the system message request is used to request the network device to send a system message to the terminal device, and the system message is information for the terminal device to access the wireless local area network; and receiving, by the terminal device, the system message sent by the network device.

In the method for accessing a wireless local area network according to the embodiments of the present disclosure, for a 5G communication system, part or all of the traffic can be transferred to the WLAN or an unlicensed frequency band by adding system information, thereby realizing the saving of resources in the authorized frequency band.

In some possible implementations, the sending, by the terminal device, the system message request to the network device includes:

sending, by the terminal device, a random access message to the network device on a specific preamble, and requesting the network device to send the system message to the terminal device through the specific preamble.

In some possible implementations, the sending, by the terminal device, the system message request to the network device includes:

sending, by the terminal device, radio resource control (RRC) signaling to the network device, the RRC signaling including the system message request.

In some possible implementations, the receiving, by the terminal device, the system message sent by the network device includes:

receiving, by the terminal device, other system information (Other SI) sent by the network device, the Other SI including the system message.

In some possible implementations, before sending, by the terminal device, the system message request to the network device, the method further includes:

receiving, by the terminal device, indication information sent by the network device, the indication information indicating whether the network device supports offloading a data stream on an air interface bearer of the network device to an unlicensed frequency band; wherein the sending, by the terminal device, the system message request to the network device includes:

when the terminal device determines that the network device supports offloading the data stream to an unlicensed frequency band, sending the system message request to the network device.

In some possible implementations, the indication information further includes: an offloading manner supported by the network device; and the method further includes:

offloading, by the terminal device, the data stream of the terminal device to the unlicensed frequency band according to the offloading manner.

In some possible implementations, the offloading manner includes: a first offloading manner and/or a second offloading manner; the first offloading manner refers to an offloading manner controlled by an access network device, and the second offloading manner refers to an offloading manner controlled by a core network device.

In some possible implementations, the indication information is carried in other system information (Other SI), or the indication information is carried in minimum system information (MIS).

In some possible implementations, the system message includes:

access point (AP) information in a cell where the terminal device is located, a parameter for the terminal device to determine whether to access the AP, and backhaul link capacity information of the AP; and the method further includes:

determining, by the terminal device, a target AP according to the system message; and accessing, by the terminal device, the wireless local area network through the target AP.

In some possible implementations, the AP information includes identification information of at least one AP available to the terminal device, and the identification information includes a service set identifier (SSID) of the AP.

In some possible implementations, the parameter includes: a received signal strength indication (RSSI).

In a second aspect, there is provided a method for accessing a wireless local area network, including:

receiving, by the network device, a system message request sent by a terminal device, wherein the system message request is used to request the network device to send a system message to the terminal device, and the system message is used for the terminal device to access the wireless local area network; and sending, by the network device, the system message to the terminal device.

In some possible implementations, the receiving, by the network device, the system message request sent by the terminal device includes:

receiving, by the network device, a random access message sent by the terminal device on a specific preamble, and requesting the network device to send the system message to the terminal device through the specific preamble.

In some possible implementations, the receiving, by the network device, the system message request sent by the terminal device includes:

receiving, by the network device, radio resource control (RRC) signaling sent by the terminal device, the RRC signaling including the system message request.

In some possible implementations, the sending, by the network device, the system message to the terminal device includes:

sending, by the network device, other system information (Other SI) to the terminal device, the Other SI including the system message.

In some possible implementations, before receiving, by the network device, the system message request sent by the terminal device, the method further includes:

generating, by the network device, indication information, wherein the indication information is used to indicate whether the network device supports offloading a data stream on an air interface bearer of the network device to an unlicensed frequency band; and sending, by the network device, the indication information to the terminal device.

In some possible implementations, the indication information further includes: an offloading manner supported by the network device, so that the terminal device offloads the data stream of the terminal device to the unlicensed frequency band according to the offloading manner.

In some possible implementations, the offloading method includes: a first offloading method and/or a second offloading method; the first offloading method refers to an offloading method controlled by an access network device, and the second offloading manner refers to an offloading manner controlled by a core network device.

In some possible implementations, the indication information is carried in other system information (Other SI), or the indication information is carried in minimum system information (MIS).

In some possible implementations, the system message includes:

access point (AP) information in a cell where the terminal device is located, a parameter used by the terminal device to determine whether to access the AP, and backhaul link capacity information of the AP.

In some possible implementations, the AP information includes identification information of at least one AP available to the terminal device, and the identification information includes a service set identifier (SSID) of the AP.

In some possible implementations, the parameter includes: a received signal strength indication (RSSI).

In a third aspect, there is provided a terminal device, including:

a sending unit, configured to send a system message request to a network device, wherein the system message request is used to request the network device to send a system message to the terminal device, and the system message is information used for the terminal device to access a wireless local area network; and a receiving unit, configured to receive the system message sent by the network device.

In a fourth aspect, there is provided a terminal device, including a transceiver, the transceiver being configured to:

send a system message request to a network device, wherein the system message request is used to request the network device to send a system message to the terminal device, and the system message is information used for the terminal device to access a wireless local area network; and receive the system message sent by the network device.

In a fifth aspect, there is provided a network device, including:

a receiving unit, configured to receive a system message request sent by a terminal device, wherein the system message request is used to request the network device to send a system message to the terminal device, and the system message is information used by the terminal device to access a wireless local area network; and a sending unit, configured to send the system message to the terminal device.

In a sixth aspect, there is provided a network device, including a transceiver, the transceiver being configured to:

receive a system message request sent by a terminal device, wherein the system message request is used to request the network device to send a system message to the terminal device, and the system message is information used by the terminal device to access a wireless local area network; and send the system message to the terminal device.

In a seventh aspect, there is provided a computer-readable medium for storing a computer program, the computer program including instructions for executing the method embodiments of the first aspect or the second aspect described above.

In an eighth aspect, there is provided a computer chip, including: an input interface, an output interface, at least one processor, and a memory, where the processor is configured to execute code in the memory, and when the code is executed, the processor may implement each process performed by the network device in the method for accessing a wireless local area network of the first aspect or the second aspect described above.

In a ninth aspect, there is provided a computer chip, including: an input interface, an output interface, at least one processor, and a memory, where the processor is configured to execute code in the memory, and when the code is executed, the processor may implement each process performed by the terminal device in the method for accessing a wireless local area network of the first aspect or the second aspect described above.

In a tenth aspect, there is provided a communication system, including the foregoing network device and the foregoing terminal device.

DETAILED DESCRIPTION

Figure 1:
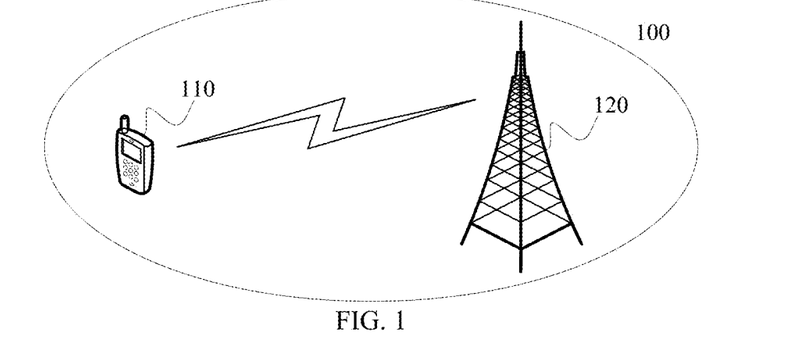
FIG. 1 is an example of an application scenario of the present disclosure.

FIG. 1 is a schematic diagram of a 5G application scenario according to an embodiment of the present disclosure.

As shown in FIG. 1, the communication system 100 may include a terminal device 110 and a network device 120. The network device 120 may communicate with the terminal device 110 through an air interface. Multi-service transmission is supported between the terminal device 110 and the network device 120.

It should be understood that the embodiment of the present disclosure is described by using the 5G communication system 100 as an example, but the embodiment of the present disclosure is not limited thereto. That is, the technical solutions of the embodiments of the present disclosure can be applied to various scenarios including the 5G communication system, for example, a mixed deployment scenario composed of a 5G communication system and a first communication system. The first communication system may be any type of communication system, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, LTE Time Division Duplex (TDD), a Universal Mobile Telecommunication System (UMTS), etc.

In addition, the present disclosure describes various embodiments in conjunction with a network device and a terminal device.

The network device 120 may refer to any entity that is used to send or receive signals on the network side, such as base station equipment in the 5G network.

The terminal device 110 may be any terminal device. Specifically, the terminal device 110 may communicate with one or more Core Networks via a Radio Access Network (RAN), and may also be referred to as an access terminal, user equipment (UE), a subscriber unit, a subscriber station, a mobile station, a mobile stage, a remote station, a remote terminal, a mobile device, a user terminal, a terminal, a wireless communication device, a user agent, or a user device. For example, it may be a cellular phone, a cordless phone, a Session Initiation Protocol (SIP) phone, a Wireless Local Loop (WLL) station, a Personal Digital Assistant (PDA), and a handheld device or computing device having wireless communication function, or other processing devices connected to a wireless modem, an in-vehicle device, a wearable device, or the like.

It should be understood that, because LTE and 5G NR are not compatible, the scenario shown in FIG. 1 is not applicable to the loose-coupling interworking and tight-coupling schemes and the unauthorized access technology in the LTE system.

Therefore, the embodiments of the present disclosure provide a method for accessing a wireless local area network, a terminal device, and a network device, which can configure the WLAN of the terminal device by enhancing system information of the 5G NR, so that the terminal device can find the target Access Point (AP) and access the WLAN through the target AP.

Figure 2:
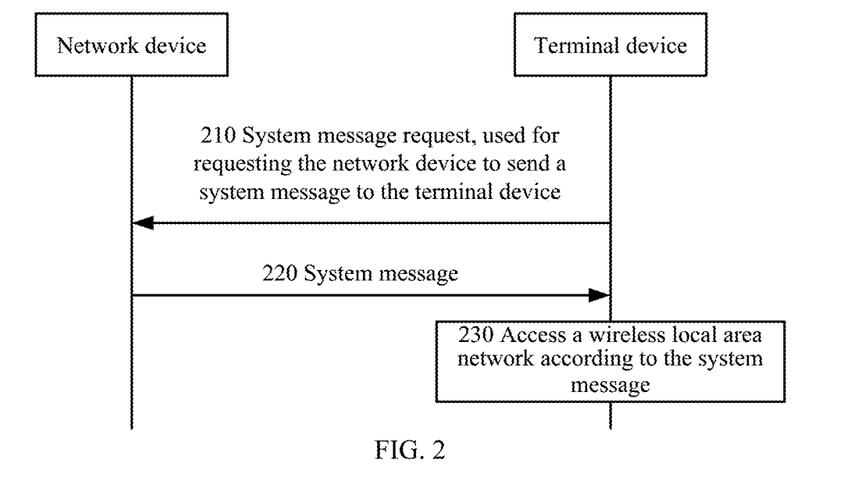
FIG. 2 is a schematic flowchart of a method for accessing a wireless local area network according to an embodiment of the present disclosure.

FIG. 2 is a schematic flowchart of a method for accessing a wireless local area network according to an embodiment of the present disclosure. It should be understood that the method in the embodiment of the present disclosure may be applied to a 5G communication system of the fifth generation mobile communication technology.

Specifically, as shown in FIG. 2, the method includes the following steps.

In 210, the terminal device sends a system message request to the network device, where the system message request is used to request the network device to send a system message to the terminal device.

In 220, the network device sends the system message to the terminal device.

In 230, the terminal device accesses the wireless local area network according to the system message.

Specifically, the terminal device sends a system message request to the network device, where the system message request is used to request the network device to send a system message to the terminal device, and the system message is information for the terminal device to access the wireless local area network; and the terminal device receives the system message sent by the network device. In other words, the network device receives the system message request sent by the terminal device, and sends the system message to the terminal device after receiving the system request message.

In short, the network device adds information for the terminal device to access the wireless local area network into the system message, and sends the system message to the terminal device in response to the system message request sent by the terminal device.

That is, in the embodiment of the present disclosure, the network device configures the WLAN of the terminal device by enhancing the system message of the 5G NR, so that the terminal device can find the target AP and access the WLAN through the target AP.

In other words, a 5G NR+WLAN terminal with a WLAN offload requirement can obtain information for accessing the WLAN from the network device through the system information, find and measure the WLAN system, and determine whether it can access the WLAN network. If yes, the terminal establishes a data bearer to the network device or to a core network to which the network device is connected through the WLAN network, and offloads the data stream on the air interface bearer of the network device to the WLAN interface, thereby saving the authorized frequency band resources.

That is, the method for accessing a wireless local area network according to the embodiment of the present disclosure can transfer part or all of the traffic to the WLAN or the unlicensed frequency band for a 5G communication system, thereby realizing the saving of resources in the authorized frequency band. For example, in consideration of Quality of Service (QoS) requirements, some or all of the traffic is transferred to the WLAN or the unlicensed frequency band.

The following describes an implementation manner in which the terminal device sends the system message request to the network device according to an embodiment of the present disclosure.

In one embodiment, the terminal device may send a random access message to the network device on a specific preamble, and request the network device to send the system message to the terminal device through the specific preamble.

In other words, the system message request may correspond to a specific preamble. When the network device receives a random access message on a specific preamble, it considers that the terminal is requesting the system message, and the network device may send the system message in a broadcast manner.

In another embodiment, the terminal device may send radio resource control (RRC) signaling to the network device, where the RRC signaling includes the system message request.

In other words, the system message may be requested by the terminal using other RRC signaling messages. These RRC signaling message requests need to indicate the requirement to the system message or a plurality of SIBs containing the system message. After receiving the RRC signaling messages, the network device may send the system message through broadcast or RRC dedicated signaling.

It should be understood that the foregoing implementation manner in which the terminal device sends the system request to the network device is merely an exemplary description, and the embodiments of the present disclosure are not limited thereto.

For example, the terminal device may send a random access message to the network device on a specific Physical Random Access Channel (PRACH) resource, and request the network device to send the system message the terminal device through the specific PRACH resource.

The following describes the implementation manner in which the terminal device receives the system message sent by the network device according to an embodiment of the present disclosure.

By way of example and not limitation, the terminal device receives other system information (Other System Information, Other SI) sent by the network device, where the Other SI includes the system message. That is, the system message is issued by the network device in response to a request from the terminal device.

It should be understood that, the information (that is, the system information in the embodiment of the present disclosure) used by the terminal device to access the wireless local area network in the LTE communication system is broadcast as system information, and in the embodiments of the present disclosure, the system message is requested by the terminal device on demand.

As a result, the terminal device in the 5G NR communication system does not know whether the network device supports offloading the data stream on the air interface bearer of the network device to an unlicensed frequency band, thereby further causing that the network device is likely need to receive a large number of system request messages.

Optionally, before the terminal device sends the system message request to the network device, the terminal device receives indication information sent by the network device, where the indication information includes: information used to indicate whether the network device supports offloading the data stream on the air interface bearer of the network device to the unlicensed frequency band; thus, when the terminal device determines that the network device supports offloading the data stream to the unlicensed frequency band, it sends the system message request to the network device.

Further, the indication information further includes: an offloading manner supported by the network device. That is, the indication information in the 5G NR system information not only indicates whether the network device supports WLAN offload, but also includes which WLAN offload manner is supported. Therefore, the terminal device unloads the data stream of the terminal device to an unlicensed frequency band according to the offloading manner.

Furthermore, in the embodiments of the present disclosure, the offloading manner includes: a first offloading manner and/or a second offloading manner; the first offloading manner refers to an offloading manner controlled by an access network device, and the second offloading manner refers to an offloading manner controlled by core network equipment.

Specifically, the first offloading manner refers to: WLAN offloading controlled by the network device without control by a core network device (CN), that is, the service flows of the APs are aggregated to the network device, and after performing a Packet Data Convergence Protocol (PDCP) layer aggregation, the network device is connected to the core network (5G Core, 5GC) of the NR network through the N3 interface. This offloading can be transparent to the CN. The second offloading manner refers to: 5GC CN-based WLAN offloading, the network device cannot fully control whether the terminal device accesses the WLAN AP, and the terminal accesses the WLAN AP through interaction with the core network. However, under the control of the CN, Quality of service (QoS) flows in the session can be transferred from the network device to the WLAN AP.

It should be understood that the foregoing first and second offloading manners are merely exemplary descriptions, and the embodiments of the present disclosure do not specifically limit the offloading manners that may be supported by the network device.

For example, other types of WLAN AP access are possible, for example, a WLAN AP that is not controlled by the 5GC or the network device.

The following describes an implementation manner in which the network device sends the indication information to the terminal device in the embodiment of the present disclosure.

Optionally, the indication information is carried in Other SI, or the indication information is carried in minimum system information (MIS).

Further, the system message may include: access point (AP) information in a cell where the terminal device is located, a parameter for the terminal device to determine whether to access the AP, and backhaul link capacity information of the AP; thus, the terminal device determines a target AP according to the system message; further, the terminal device accesses the wireless local area network through the target AP.

Optionally, the AP information may include identification information of at least one AP available to the terminal device. Further, the identification information may include: a Service Set Identifier (SSID) of the AP. As another example, the parameter includes: a Received Signal Strength Indication (RSSI).

It should be understood that the specific content of the foregoing AP information and parameter is only an exemplary description, and the embodiment of the present disclosure is not specifically limited thereto.

Figure 3:
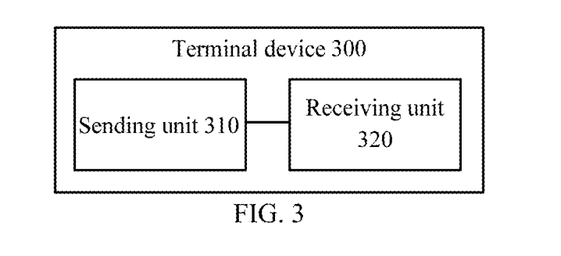
FIG. 3 is a schematic block diagram of a terminal device according to an embodiment of the present disclosure.

FIG. 3 is a schematic block diagram of a terminal device according to an embodiment of the present disclosure.

As shown in FIG. 3, the terminal device 300 includes:

a sending unit 310, configured to send a system message request to a network device, where the system message request is used to request the network device to send a system message to the terminal device, and the system message is information for the terminal device to access the wireless local area network; and a receiving unit 320, configured to receive the system message sent by the network device.

Optionally, the sending unit 310 is specifically configured to:

send a random access message to the network device on a specific preamble, and request the network device to send the system message to the terminal device through the specific preamble.

Optionally, the sending unit 310 is specifically configured to:

send radio resource control (RRC) signaling to the network device, where the RRC signaling includes the system message request.

Optionally, the receiving unit 320 is specifically configured to:

receive other system information (Other SI) sent by the network device, where the Other SI includes the system message.

Optionally, the receiving unit 320 is further configured to:

before the sending unit 310 sends the system message request to the network device, receive indication information sent by the network device, where the indication information includes: information used to indicate whether the network device supports offloading the data stream on the air interface bearer of the network device to an unauthorized frequency band; where the sending unit 310 is specifically configured to:

when it is determined that the network device supports offloading the data stream to the unlicensed frequency band, send the system message request to the network device.

Optionally, the indication information further includes: an offloading manner supported by the network device; and the terminal device also includes:

a processing unit, configured to offload the data stream of the terminal device to the unlicensed frequency band according to the offloading manner.

Optionally, the offloading manner includes: a first offloading manner and/or a second offloading manner; the first offloading manner refers to an offloading manner controlled by an access network device, and the second offloading manner refers to an offloading manner controlled by a core network device.

Optionally, the indication information is carried in other system information (Other SI), or the indication information is carried in the minimum system information (MIS).

Optionally, the system message includes:

access point (AP) information in a cell where the terminal device is located, a parameter for the terminal device to determine whether to access the AP, and backhaul link capacity information of the AP; and the terminal device further includes: a processing unit, the processing unit being configured to:

determine a target AP according to the system message; and access the wireless local area network through the target AP.

Optionally, the AP information includes identification information of at least one AP available to the terminal device, and the identification information includes a service set identifier (SSID) of the AP.

Optionally, the parameter includes: a received signal strength indication (RSSI).

Figure 4:
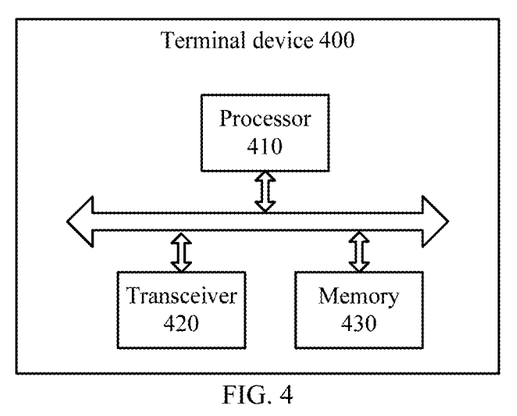
FIG. 4 is a schematic block diagram of another terminal device according to an embodiment of the present disclosure.

It should be noted that both the receiving unit 310 and the receiving unit 320 may be implemented by a transceiver, and the processing unit may be implemented by a processor. As shown in FIG. 4, the terminal device 400 may include a processor 410, a transceiver 420, and a memory 430. The memory 430 may be used to store the indication information, and may also be used to store code, instructions, and the like executed by the processor 410. Various components in the terminal device 400 are connected by a bus system. The bus system includes a power bus, a control bus, and a status signal bus in addition to a data bus.

The terminal device 400 shown in FIG. 4 can implement the processes implemented by the terminal device in the foregoing method embodiment in FIG. 2. To avoid repetition, details are not described herein again.

Figure 5:
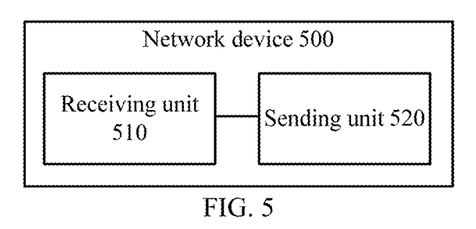
FIG. 5 is a schematic block diagram of a network device according to an embodiment of the present disclosure.

FIG. 5 is a schematic block diagram of a network device according to an embodiment of the present disclosure.

Specifically, the network device 500 includes:

a receiving unit 510, configured to receive a system message request sent by a terminal device, where the system message request is used to request the network device to send a system message to the terminal device, and the system message is used for the terminal device to access the wireless local area network; and a sending unit 520, configured to send the system message to the terminal device.

Optionally, the receiving unit 510 is specifically configured to:

receive a random access message sent by the terminal device on a specific preamble, and request the network device to send the system message to the terminal device through the specific preamble.

Optionally, the receiving unit 510 is specifically configured to:

receive radio resource control (RRC) signaling sent by the terminal device, where the RRC signaling includes the system message request.

Optionally, the sending unit 520 is specifically configured to:

send other system information (Other SI) to the terminal device, where the Other SI includes the system message.

Optionally, the network device further includes:

a processing unit, configured to generate indication information before the receiving unit 510 receives the system message request sent by the terminal device, where the indication information includes: information used to indicate whether the network device supports offloading a data stream on an air interface bearer of the network device to an unlicensed frequency band; and the sending unit 520 is further configured to send the indication information to the terminal device.

Optionally, the indication information further includes: an offloading manner supported by the network device, so that the terminal device offloads the data stream of the terminal device to an unlicensed frequency band according to the offloading manner.

Optionally, the offloading manner includes: a first offloading manner and/or a second offloading manner; the first offloading manner refers to an offloading manner controlled by an access network device, and the second offloading manner refers to an offloading manner controlled by a core network device.

Optionally, the indication information is carried in other system information (Other SI), or the indication information is carried in the minimum system information (MIS).

Optionally, the system message includes:

access point (AP) information in a cell where the terminal device is located, a parameter for the terminal device to determine whether to access the AP, and backhaul link capacity information of the AP.

Optionally, the AP information includes identification information of at least one AP available to the terminal device, and the identification information includes a service set identifier (SSID) of the AP.

Optionally, the parameter includes: a received signal strength indication (RSSI).

Figure 6:
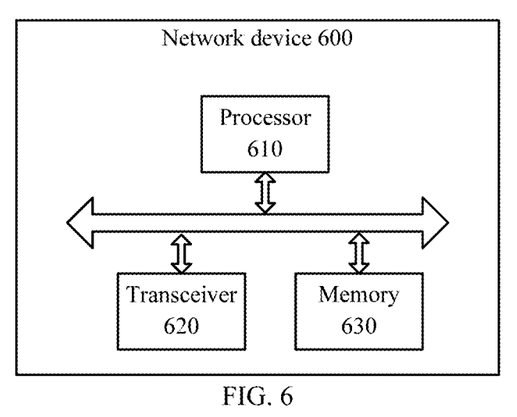
FIG. 6 is a schematic block diagram of another network device according to an embodiment of the present disclosure.

It should be noted that both the receiving unit 510 and the sending unit 520 may be implemented by a transceiver, and the processing unit may be implemented by a processor. As shown in FIG. 6, the network device 600 may include a processor 610, a transceiver 620, and a memory 630. The memory 630 may be used to store indication information, and may also be used to store codes, instructions and the like executed by the processor 610. Various components in the network device 600 are connected through a bus system. The bus system includes a power bus, a control bus, and a status signal bus in addition to a data bus.

The network device 600 shown in FIG. 6 can implement the processes implemented by the network device in the method embodiment in FIG. 2. To avoid repetition, details are not described herein again.

It should be understood that the method embodiments in the embodiments of the present disclosure may be applied to a processor or implemented by a processor.

In the implementation process, each step of the method embodiments in the embodiments of the present disclosure can be accomplished by the hardware integrated logic circuitry in the processor, or the instructions in form of software. More specifically, the steps in the method disclosed in conjunction with the embodiments of the present disclosure may be directly executed and completed by a hardware decoding processor, or executed and completed by a combination of hardware and software modules in the decoding processor. The software module may reside in the mature storage medium in the art, such as a random access memory, a flash memory, a read only memory, a programmable read-only memory or an electrically erasable programmable memory, and a register. The storage medium is located in the memory, and the processor reads the information in the memory, and completes the steps of the method described above in combination with its hardware.

The processor may be an integrated circuit chip, which has a signal processing capability, and may implement or execute the methods, the steps and the logic diagrams disclosed in the embodiments of the present disclosure. For example, the above processor may be a general purpose processor, a digital signal processor (DSP), an application specific integrated circuit (ASIC), a field programmable gate array (FPGA) or other programmable logic device, transistor logic device, discrete hardware component, and the like. Further, the general purpose processor may be a microprocessor or the processor may be any conventional processor or the like.

In addition, in the embodiments of the present disclosure, the memory may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM) that acts as an external high speed cache. It should be understood that the above memories are exemplary but not restrictive. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), and the like. That is, the memories of the systems and methods described herein are intended to include but not limited to these and any other suitable types of memories.

Finally, it should be noted that the terminologies used in the embodiments of the present disclosure and the appended claims are for the purpose of describing particular embodiments only, and are not intended to limit the embodiments of the present disclosure.

For example, the singular forms "a", "the", and "said" used in the embodiments of the present disclosure and the appended claims are intended to include the plural forms as well, unless the context clearly indicates otherwise.

As another example, depending on the context, the word "when" as used herein may be interpreted as "if" or "in case" or "while" or "in response to determination" or "in response to detection". Similarly, depending on the context, the phrase "if determining" or "if detecting (the stated condition or event)" may be interpreted as "when determining" or "in response to determination" or "when detecting (the stated condition or event)" or "in response to detection (the stated condition or event)".

Those of ordinary skills in the art may be aware that, the units and algorithm steps of individual examples described in combination with the embodiments disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the embodiments of the present disclosure.

It may be clearly understood by those of ordinary skills in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the embodiments.

In addition, respective functional units in the embodiments of the present disclosure may be integrated in one processing unit, or respective units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the embodiments of the present disclosure, or the part contributing to the related art or a part of the technical solutions, may be embodied in the form of a software product. The computer software product is stored in a storage medium including several instructions such that a computer device (which may be a personal computer, a server, or a network device, etc.) performs all or a part of steps of the method described in the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed implementations of the embodiments of the present disclosure, and the protection scope of the embodiments of the present disclosure is not limited thereto. Any person skilled in the art can easily think of changes or substitutions within the technical scope disclosed by the embodiments of the present disclosure, and all the changes or substitutions should be covered by the protection scope of the embodiments of the present disclosure. Therefore, the protection scope of the embodiments of the present disclosure should be subjected to the protection scope of the claims.

What is claimed is:

1. A method for accessing a wireless local area network, comprising:
   receiving, by a terminal device, indication information sent by a network device, the indication information indicating whether the network device supports offloading a data stream on an air interface bearer of the network device to an unlicensed frequency band;
   in response to determining that the network device supports offloading the data stream to the unlicensed frequency band, sending, by the terminal device, a system message request to the network device, wherein the system message request is used to request the network device to send a system message to the terminal device, and the system message is information for the terminal device to access the wireless local area network; and
   receiving, by the terminal device, the system message sent by the network device,
   wherein the indication information further comprises: an offloading manner supported by the network device, and
   the method further comprises:
   offloading, by the terminal device, the data stream of the terminal device to the unlicensed frequency band according to the offloading manner,
   wherein the offloading manner comprises: at least one of a first offloading manner and a second offloading manner, the first offloading manner refers to an offloading manner controlled by an access network device, and the second offloading manner refers to an offloading manner controlled by a core network device;
   wherein the receiving, by the terminal device, the system message sent by the network device comprises: receiving, by the terminal device, other system information (Other SI) sent by the network device, the Other SI comprising the system message;
   wherein the indication information is carried in the Other SI, or the indication information is carried in minimum system information (MIS);
   wherein the system message comprises:
   access point (AP) information in a cell where the terminal device is located, a parameter for the terminal device to determine whether to access the AP, and backhaul link capacity information of the AP, and
   the method further comprises:
   determining, by the terminal device, a target AP according to the system message; and
   accessing, by the terminal device, the wireless local area network through the target AP;
   wherein the AP information comprises identification information of at least one AP available to the terminal device, and the identification information comprises a service set identifier (SSID) of the AP.

2. The method according to claim 1, wherein the sending, by the terminal device, the system message request to the network device comprises one of the following:
   sending, by the terminal device, a random access message to the network device on a specific preamble, and requesting the network device to send the system message to the terminal device through the specific preamble; and sending, by the terminal device, radio resource control (RRC) signaling to the network device, the RRC signaling comprising the system message request.

3. The method according to claim 1, wherein the parameter comprises: a received signal strength indication (RSSI).

4. A terminal device, comprising:
   a transceiver, configured to receive indication information sent by a network device, the indication information indicating whether the network device supports offloading a data stream on an air interface bearer of the network device to an unlicensed frequency band;
   in response to determining that the network device supports offloading the data stream to the unlicensed frequency band, send a system message request to the network device, wherein the system message request is used to request the network device to send a system message to the terminal device, and the system message is information used for the terminal device to access a wireless local area network; and
   receive the system message sent by the network device,
   wherein the indication information further comprises: an offloading manner supported by the network device; and
   the terminal device further comprises:
   a processor, configured to offload the data stream of the terminal device to the unlicensed frequency band according to the offloading manner,
   wherein the offloading manner comprises: at least one of a first offloading manner and a second offloading manner; the first offloading manner refers to an offloading manner controlled by an access network device, and the second offloading manner refers to an offloading manner controlled by a core network device;
   wherein the transceiver is further configured to receive other system information (Other SI) sent by the network device, the Other SI comprising the system message;
   wherein the indication information is carried in the Other SI, or the indication information is carried in minimum system information (MIS);
   wherein the system message comprises:
   access point (AP) information in a cell where the terminal device is located, a parameter for the terminal device to determine whether to access the AP, and backhaul link capacity information of the AP; and
   the processor being further configured to:

determine a target AP according to the system message; and access the wireless local area network through the target AP;

wherein the AP information comprises identification information of at least one AP available to the terminal device, and the identification information comprises a service set identifier (SSID) of the AP.

5. The terminal device according to claim 4, wherein the transceiver is further configured to perform one of the following:

send a random access message to the network device on a specific preamble, and request the network device to send the system message to the terminal device through the specific preamble; and send radio resource control (RRC) signaling to the network device, the RRC signaling comprising the system message request.

6. A network device, comprising:

a transceiver, configured to:

receive a system message request sent by a terminal device, wherein the system message request is used to request the network device to send a system message to the terminal device, and the system message is information used by the terminal device to access a wireless local area network; and send the system message to the terminal device;

a processor, configured to generate indication information before the transceiver receives the system message request sent by the terminal device, wherein the indication information is used to indicate whether the network device supports offloading a data stream on an air interface bearer of the network device to an unlicensed frequency band; and wherein the transceiver is further configured to:

send the indication information to the terminal device;

send other system information (Other SI) to the terminal device, the Other SI comprising the system message;

wherein the indication information further comprises: an offloading manner supported by the network device, so that the terminal device can offload the data stream of the terminal device to the unlicensed frequency band according to the offloading manner;

wherein the offloading manner comprises: at least one of a first offloading manner and a second offloading manner, the first offloading manner refers to an offloading manner controlled by an access network device, and the second offloading manner refers to an offloading manner controlled by a core network device;

wherein the indication information is carried in the Other SI, or the indication information is carried in minimum system information (MIS);

wherein the system message comprises access point (AP) information in a cell where the terminal device is located, a parameter for the terminal device to determine whether to access the AP, and backhaul link capacity information of the AP;

wherein the AP information comprises identification information of at least one AP available to the terminal device, and the identification information comprises a service set identifier (SSID) of the AP.

* * * * *